United States Patent
Route et al.

[11] 4,143,368
[45] Mar. 6, 1979

[54] VEHICLE OPERATOR SECURITY SYSTEM

[75] Inventors: William D. Route, Bloomfield Hills; John T. Auman, Washington; Wesley A. Rogers, Grosse Pointe Park, all of Mich.

[73] Assignee: General Motors Corporation, Detroit, Mich.

[21] Appl. No.: 857,093

[22] Filed: Dec. 5, 1977

[51] Int. Cl.² ........................ B60R 25/04; G08B 13/08
[52] U.S. Cl. .................................. 340/543; 343/225; 340/63
[58] Field of Search ................... 343/225; 340/63, 543, 340/147 MD

[56] References Cited
U.S. PATENT DOCUMENTS
3,634,880   1/1972   Hawkins ............................. 340/63

*Primary Examiner*—Harold I. Pitts
*Attorney, Agent, or Firm*—Robert M. Sigler

[57] ABSTRACT

A portable infrared signal generator is actuatable by a motor vehicle operator at a distance from the vehicle to generate digitally coded infrared signal pulses in accordance with either a first or a second predetermined digital code. A receiver on the motor vehicle is effective to receive the infrared signal pulses, decode them and actuate apparatus responsive to the first digital code to unlock a power door lock and power a light effective to illuminate at least a part of the vehicle or responsive to the second digital code to actuate an alarm. Both the first and second digital codes contain a common identifying portion substantially unique to the particular motor vehicle, which portion may be permanently stored in the generator and receiver by the connections of the input/output terminals of a microprocessor chip mounted on a printed circuit board to one of two voltage sources on the printed circuit board. The receiver includes a photodiode connected in a circuit to operate in the photovoltaic mode so that the infrared pulses can be distinguished from strong background illumination for operation in daylight as well as at night. The receiver further includes a lens and reflector for receiving the infrared pulses over a wide incoming angle. The apparatus may include a sleep mode in which the reception of a predetermined number of signals not containing the code unique to the motor vehicle actuates apparatus to prevent unlocking of the doors and to actuate the alarm.

3 Claims, 6 Drawing Figures

TRANSMITTER

RECEIVER

VEHICLE OPERATOR SECURITY SYSTEM

BACKGROUND OF THE INVENTION

This invention relates to security systems for the operators of motor vehicles and particularly to such systems for increasing the security of such operators as they are approaching their parked vehicles. Concern has been expressed by a substantial number of motor vehicle owners and operators about their personal safety as they approach their parked vehicles, especially in lonely or deserted areas of cities and in large parking lots or decks which afford hiding places for a person planning robbery or some other personal criminal act. Potential offenders have been known to hide in back seats of parked vehicles or between or under such vehicles and wait for the operator to return. The vehicle operator standing beside the front door while he unlocks it or sitting in the front seat may be surprised by such a person. The publicity given to several incidents of this nature; and the increasing use of large parking lots and decks, which are often unguarded and sometimes poorly lit at night, have increased the apprehension of many vehicle operators concerning their own security.

SUMMARY OF THE INVENTION

It is the general object of this invention to provide a system which will increase the security of a vehicle operator as he approaches his vehicle and thus reduce the apprehension felt by the operator concerning his personal safety. The invention generally comprises a portable infrared signal generator adapted to be carried by the vehicle operator when he leaves his vehicle and including apparatus actuatable to generate, selectively, at least two separate digitally coded infrared signals. Means on the vehicle are provided to receive said signals, decode them and actuate apparatus, in response to the first digital code, to unlock a door lock of the vehicle and actuate a light to illuminate at least part of the vehicle and, in response to the second digital code, to sound an alarm on the vehicle. A portion of the digital codes is common to each and substantially unique to the particular motor vehicle so that only a particular portable unit is likely to actuate the apparatus on the corresponding vehicle; and it will not actuate the apparatus on a neighboring vehicle which may also be provided with similar apparatus.

The invention may include a receiving circuit on the vehicle including a photodiode connected to operate in the photovoltaic mode so that the infrared pulses of the digitally coded signals can be differentiated from the strong background radiation of bright daylight, as well as at night. The photodiode may be used in conjunction with a lens and reflector capable of receiving and concentrating the signals from a wide incoming angle onto said photodiode.

Thus, the vehicle operator is provided by this invention with apparatus for unlocking at least the driver's side door of the vehicle and illuminating at least a portion of the vehicle from a safe distance, so that he may inspect the vehicle as he approaches it and may immediately enter the vehicle without having to use his key. In addition, the operator can, at any time on his approach to the vehicle, actuate an alarm to summon assistance, should he perceive a reason for so doing.

Further details and advantages of this invention will be apparent from the accompanying figures and following description of a preferred embodiment.

DESCRIPTION OF A PREFERRED EMBODIMENT

Figure 1:
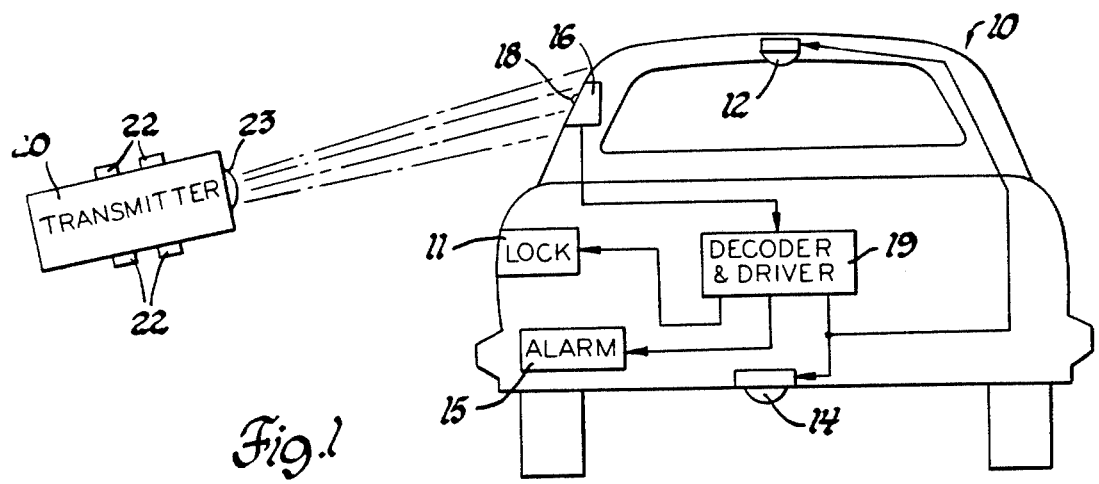
FIG. 1 shows a schematic diagram of a preferred embodiment of this invention.

Referring to FIG. 1, a motor vehicle 10 is provided with a lock 11 on at least the driver's side door, the lock 11 being of the type including power lock and unlock means. Motor vehicle 10 further includes lighting means such as the standard overhead dome light 12 for illuminating the interior of the vehicle or a lower light 14 for illuminating the area beneath the vehicle. It is understood that the illumination means may be some other light or lights in some other locations, including lights to illuminate the area around the vehicle. The specific lights shown are only by way of example.

Motor vehicle 10 is further provided with an alarm 15, which generates a signal which may be auditory, visual, radio or some other type. One common example of such an alarm is the motor vehicle's own horn and headlights which are actuated simultaneously in an intermittent manner on many common vehicle theft prevention systems. However, any alarm capable of signalling potential assistance can be used in this invention.

Motor vehicle 10 further includes a receiver 16 having at least one lens 18 on an external point of the vehicle body for the reception of infrared signal pulses, as well as means for converting the signals to electrical pulses, amplifying them and reshaping them to a usable form. In addition to the location shown in FIG. 1, many other locations are suitable, such as the top of the vehicle roof above the dome light 12. In addition, multiple lenses 18 or receivers 16 may be used at different locations or in one location faced in different directions. Fiber optic conduits may be used to conduct the signal pulses from one or more lenses 18 to a common receiver and amplifier; or separate small amplifiers may be used at each lens for an initial signal boost and conduction over an electrical conduit. The signals from receiver 16 are provided to decoder and driver means 19 which decode the signals received and actuate apparatus such as relays in response to said signals to power means for the unlocking of lock 11 or the actuation of lights 12 and 14 or alarm 15.

A transmitter 20 is shown, enlarged for convenience, in FIG. 1. Transmitter 20 is shown with a plurality of actuating buttons 22, which are four in this embodiment, each of which will produce a different digitally coded train of infrared pulses which are directed by a lens 23 on transmitter 20. Transmitter 20 may thus be aimed to direct the infrared signal pulses in the direction of lens 18 of receiver 16.

Figure 2:
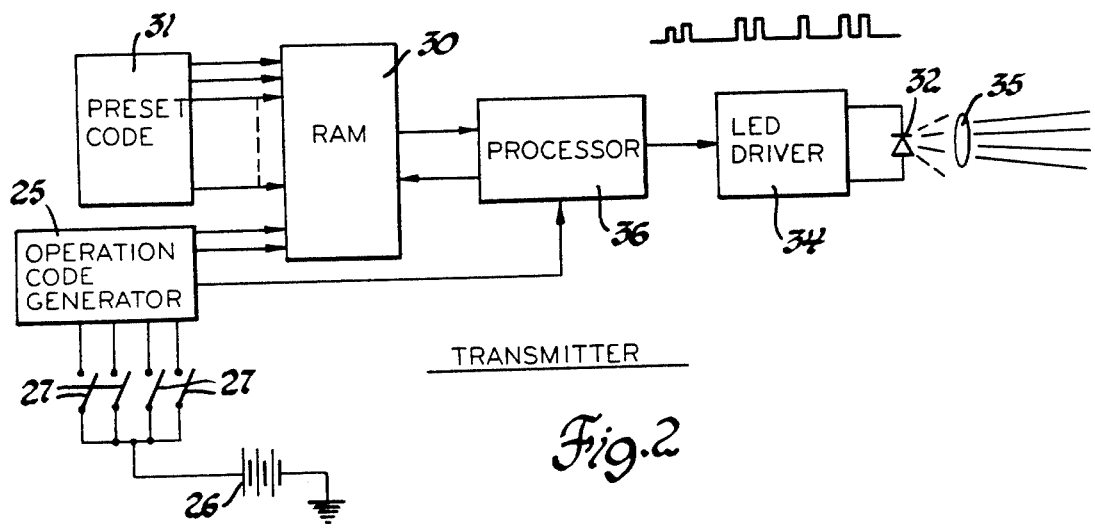
FIG. 2 shows a block diagram of a transmitter for use in the apparatus of FIG. 1.

FIG. 2 shows a block diagram of the apparatus in transmitter 20. An operation code generator 25 includes circuits, not shown, which can be connected to a source 26 of electric voltage, which may be a battery, through a plurality of switches 27. There are four switches 27 in this embodiment, each switch 27 being actuated by one of the push buttons 22. Each of the switches 27 is adapted to actuate a particular circuit to generate an operation code corresponding to a particular apparatus on vehicle 10: for instance, the first switch might cause generation of a code corresponding to actuation of door unlocking means and a light while the second switch causes generation of a code corresponding to actuation of the alarm. The third and fourth switches might cause the generation of codes corresponding to the actuation of other apparatus not shown. In this embodiment, each switch causes the generation in operation code generator 25 of a different two bit binary operation code, which may be applied to two bit locations in a random access memory or RAM 30. Preset code storage means 31 permanently contains a 14 bit identification code which matches a similar code stored in the vehicle decoder 19 and is substantially unique to that vehicle in the sense that there are a large number of such codes and therefore, even if the same code is assigned to more than one vehicle, it is unlikely that any two vehicles in the same vicinity will have the same code. Preset code storage means 31 is adapted to supply the 14 bits of this code to 14 bit locations in RAM 30.

Transmitter 20 also includes a light emitting diode 32 and an LED driver 34 adapted to supply current to light emitting diode 32 and cause it to emit infrared radiation, which can be directed by a lens 35 as shown in FIG. 2. LED driver 34 includes switching circuitry so that the infrared radiation can be emitted in pulses of controlled duration and timing in response to signals applied to LED driver 34.

The transmitter 20 finally includes a processor 36 for controlling and coordinating the activity of the remainder of the apparatus. Processor 36 may include a read only memory for the storage of a program to control the operation of the transmitter according to the flow chart shown in FIG. 5. The actuation of any of the switches 27 causes the generation of a particular operation code in generator 25 and also causes an initiation signal to be sent to processor 36. Processor 36 then causes the operation code from generator 25 and the preset identity code from preset code storage means 31 to be entered in RAM 30. Processor 36 then examines the bit locations in RAM 30 serially and generates a series of timed pulses to form a digital code word as shown in FIG. 4, the pulses being applied to LED driver 34 to cause light emitting diode 32 to generate corresponding infrared pulses.

Figure 4:
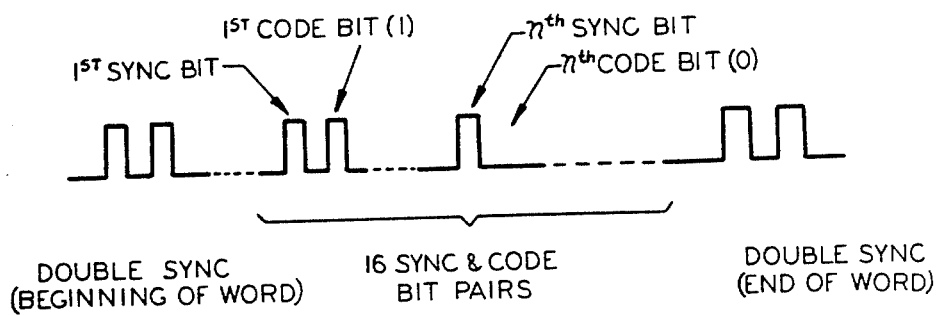
FIG. 4 shows a digitally coded pulse train of the type generated by the transmitter of FIG. 2.
Figure 5:
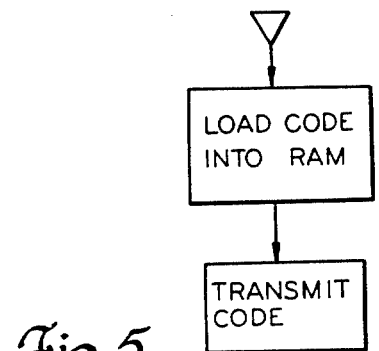
FIG. 5 shows a flow chart describing the operation of the transmitter of FIG. 2.

The code word, as seen in FIG. 4, comprises first and last pairs of double sync pulses which bracket, in this embodiment, 16 bit pairs, each of which comprises a first sync pulse and a following code bit which comprises a pulse in the case of a digital one and the absence of a pulse in the case of a digital zero. The timing and pulse width of all the pulses is predetermined by processor 36; but the specific code which determines the presence or absence of a pulse in each code bit location is determined by the code stored in RAM 30.

The processor 36 and RAM 30 comprise two portions of a microprocessor chip such as the Rockwell PPS 76, a four bit microprocessor which is purchased with a custom program in a read only memory and is suitable for mounting on a larger chip or circuit board containing operation code generator 25 and LED driver 34. Preset code storage means 31 could be part of the read only memory in processor 36; however, it preferably takes a different form. In mounting the microprocessor chip containing processor 36 and RAM 30 on the larger chip or board, the inputs to the 14 bit locations of RAM 30 are set up in such a way that a permanent connection may be made between each input and a source of one of two supply voltages by means of a short conducting lead. Thus the preset identity code can be permanently established at a point external to the microprocessor chip, with the result that a single version of the microprocessor chip can be manufactured in large volume at a much lower cost per unit than would be the case if microprocessor chips had to be manufactured with thousands of different read only memories. This procedure has a further advantage in that a universal replacement transmitter can be stocked at repair shops or dealerships and encoded by properly trained personnel for a particular vehicle as a replacement transmitter.

Figure 3:
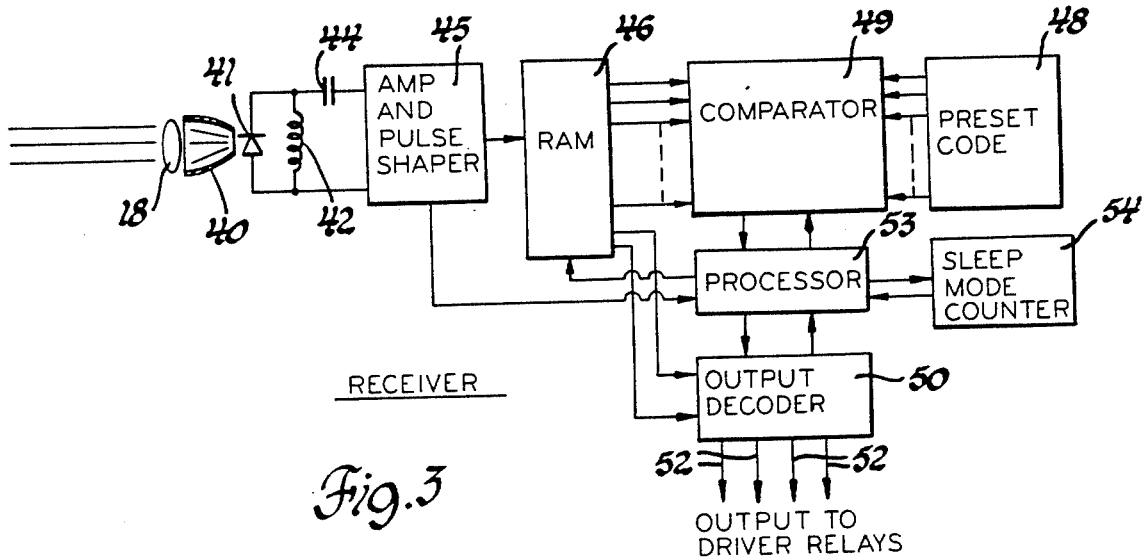
FIG. 3 shows a block diagram of a receiver for use in the apparatus of FIG. 1.

The receiver 16, as well as a portion of decoder and driver 19, is shown as the receiver in FIG. 3. Lens 18 and reflector 40, which reflector may be generally parabolic, are designed to concentrate infrared radiation from a wide input angle onto a photodiode 41 which is connected in parallel with an inductor 42 and in series with a capacitor 44 across the input of an amplifier and pulse shaper 45. No supply voltage is applied across photodiode 41; rather, photodiode 41 is operated in the photovoltaic mode across the input to an amplifier. Even in strong background illumination such as that encountered in bright daylight, a sudden increase in illumination will cause a similar sudden change in current through diode 41 which causes a voltage change in inductor 42. This sudden voltage change is passed by capacitor 44 to amp and pulse shaper 45 where it is converted to a well formed pulse and amplified to usable amplitude. This circuitry is in contrast to the normal photodiode connection where the photodiode and a resistor form a voltage divider across which a constant bias voltage is applied; since such a circuit does not detect infrared pulses over a wide enough range of background illumination to be useful both at night and in bright daylight.

Figure 6:
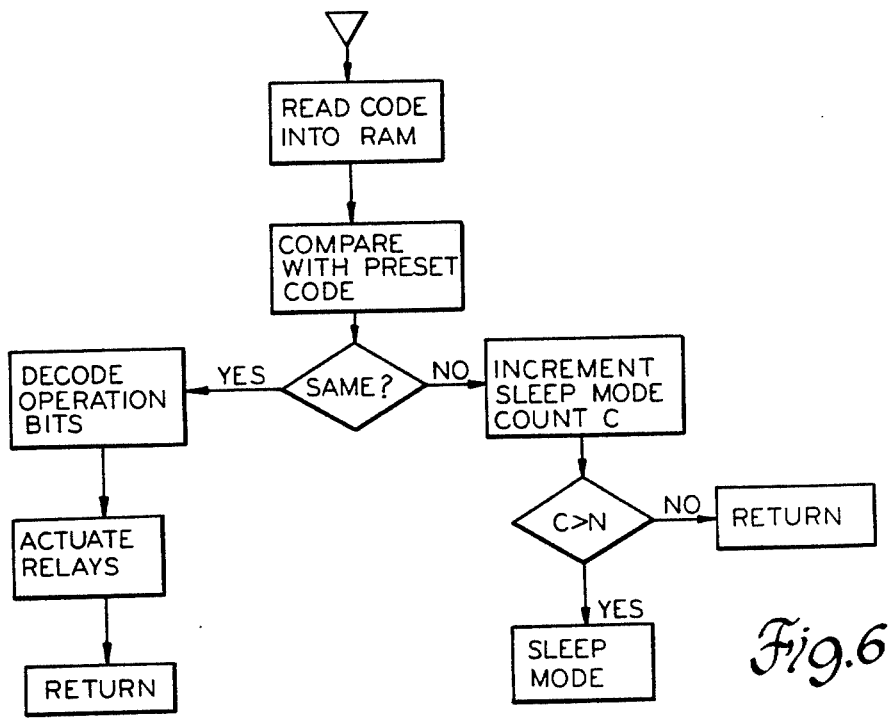
FIG. 6 shows a flow chart describing the operation of the receiver of FIG. 3.

The receiver of FIG. 3 also includes a RAM 46 similar to RAM 30 of FIG. 2 and a preset code storage means 48 similar to preset code storage means 31 of FIG. 2. A digital comparator 49 is adapted to receive the 14 bits from preset code storage means 48 and the first 14 bits of RAM 46 and compare them bit by bit. An output decoder 50 is adapted to receive the last two bits of RAM 46 and is provided with output lines 52, four in number in this embodiment, to the driver relays of apparatus such as lock 11, alarm 15 and lights 12 and 14. Output decoder 50 includes circuitry responsive to each of the four possible two bit codes from RAM 46 to supply an output signal on one of the output lines 52. A processor 53 is provided to coordinate the operation of the other apparatus as in the flow chart of FIG. 6. As with processor 36, a program corresponding to the flow chart of FIG. 6 can be stored in a read only memory in processor 53. In addition, the chip of processor 53 actually includes RAM 46, comparator 49, counter 54 and output decoder 50, shown separately for convenience.

Upon the receipt of the first double sync pulse of a code word by amplifier and pulse shaper 45, an initiating signal is provided to processor 53 to place RAM 46 in condition to serially receive the code bits of the code word and store them in order and the proper bit locations. At the end of the receipt of the code word and storage thereof in RAM 46, processor 53 initiates the transfer of the first 14 bits of the code word from RAM 46 to comparator 49 and likewise the 14 bits in preset code storage means 48 to comparator 49. If and only if comparator 49 indicates that the codes are identical, processor 53 causes the transfer of the two operation code bits from RAM 46 to output decoder 50 to actuate the proper relay or relays.

An optional addition to the receiver is a sleep mode counter 54 which is actuated to count up one count when comparator 49 indicates that the received identity code bits are not identical with those stored in preset code storage means 48. Sleep mode counter 54 is characterized by predetermined count N such that, when the count of sleep mode counter reaches N within a predetermined time, processor 53 signalled to cause output decoder 50 to actuate the alarm relay and prevent the door unlock relay from being actuated. This state, where the door cannot be unlocked by means of an external transmitter 20, is called the sleep mode and might be held for a specific time or until the door is unlocked by a conventional key, opened and closed. The apparatus relating to the sleep mode is suggested as a possible defense against a prospective vehicle thief with a computer controlled transmitter which would automatically cycle through all possible digital codes in some order in an attempt to unlock the door without knowing the proper code. It is not known by these inventors whether such a device is actually of sufficient feasibility and practicality to be of concern; and, in addition, this additional apparatus is more concerned with the security of the vehicle than with the security of the vehicle operator. Therefore this additional sleep mode apparatus is considered as optional and not a necessary part of this invention.

In the preferred embodiment of this invention, one of the four possible operation codes is reserved for the unlocking of lock 11 and the actuation of lights 12 and 14; another of the operation codes actuates alarm 14. Thus two operation codes remain. If they are not needed for further functions, the operation codes could be reduced to one bit and one bit could be added to the identity code to double the number of possible unique identity codes. Alternatively, a RAM of smaller capacity could be used if that led to a decrease in cost. However, other functions are conceivable for the remaining two operation codes in this embodiment. For instance, the door lock 11 could be locked by remote control after the operator has left the vehicle; or the lights 12 and 14 could be actuated separately from the unlocking of lock 11. Perhaps the engine of vehicle 10 itself could be started by means of one of the operation codes. Other uses will occur to those skilled in the art.

It is also contemplated, within the scope of this invention, that transmitter 20 could be stored in a suitable receptacle within the dash of vehicle 10 while vehicle 10 is in use. This receptacle may include means for recharging the battery 26 of transmitter 20 while the vehicle 10 is operating and may further have an LED adapted to be in line with lens 23 when transmitter 20 is so inserted, the LED being connected to the receiver such that, with the proper operation code, the vehicle ignition will be unlocked and the engine startable and drivable without the standard ignition key. With this arrangement, the vehicle operator could unlock the vehicle door as he approached it, climb into the vehicle, insert the transmitter in the dash, start the vehicle and drive away without ever having to take the time to find and use the ignition key, if he so desired.

It is further contemplated that, as a protection against any of the functions being activated by spurious signals, the transmitter may be programmed to send the code at least twice and the receiver programmed to receive the correct identity code twice before acting.

It will be appreciated by those skilled in the art that, although a preferred embodiment is shown and described herein, equivalent embodiments are possible within the scope of this invention, which should be limited only by the claims which follow.

The embodiments of the invention in which an exclusive property or privilege is claimed are defined as follows:

1. An operator-actuated security system for a motor vehicle having a door with lock means, power means to unlock the lock, a light effective to illuminate at least a part of the vehicle, and an alarm effective when energized to produce a sensible effect outside the vehicle, comprising, in combination:

a portable infrared rediation generator effective on one manual actuation to generate a series of pulses of infrared radiation in accordance with a first predetermined digital code and on another manual actuation to generate a series of pulses of infrared radiation in accordance with a second predetermined digital code; and means on the vehicle effective to receive the radiation from said generator and including elements responsive to the first code effective to unlock the door and energize the interior light, whereby an operator external to the vehicle and at a distance therefrom can unlock the door and energize the light, and including further elements responsive to the second code to actuate the alarm should the vehicle operator perceive a reason for so doing.

2. An operator actuated security system for a motor vehicle having a door with lock means, power means to unlock the lock, a light effective to illuminate at least a part of the vehicle and an alarm effective when energized to produce a sensible effect outside the vehicle, comprising, in combination:

a portable infrared radiation generator including means actuatable to generate a directed series of infrared radiation pulses comprising a first digital code and means separately actuatable to generate a directed series of infrared radiation pulses comprising a second digital code, the first and second digital codes having a series of identity bits comprising a predetermined identity code substantially unique to the vehicle and common to each of the first and second digital codes and one or more operation bits comprising an operation code being different in each of the first and second digital codes;

means on the vehicle effective to store the predetermined identity code and receive the radiation from the generator and including means effective to decode the series of identity bits of the received pulses, compare them, bit by bit, with the stored predetermined identity code and signal identity therebetween; and means on the vehicle responsive to said signal of identity to decode the operation bits and effective to unlock the door and energize the light in response to the operation bits of the first digital code, and to actuate the alarm in response to the operation bits of the second digital code.

3. An operator actuated security system for a motor vehicle having a door with lock means and power unlock means, power means to unlock the lock, a light effective to illuminate at least part of the vehicle and an alarm effective when energized to produce a sensible effect outside the vehicle, comprising in combination:

a portable infrared radiation generator effective on one manual actuation to generate a series of pulses of infrared radiation in accordance with a first predetermined digital code and on another manual actuation to generate a series of pulses of infrared radiation in accordance with a second predetermined digital code;

means on the vehicle effective to receive the radiation from said generator, said means including a photodiode connected in parallel with an inductor and in series with a capacitor across the inputs of an amplifier, said photodiode being thus connected for operation in the photovoltaic mode for reception of the radiation in the strong background radiation of daylight as well as in darkness; and means responsive to the received first digital code to actuate the power door unlock means and light and further responsive to the received second digital code to actuate the alarm.

* * * * *